United States Patent
Jaggard

(10) Patent No.: US 12,172,749 B2
(45) Date of Patent: Dec. 24, 2024

(54) AIRCRAFT LANDING GEAR SHOCK ABSORBER

(71) Applicant: AIRBUS OPERATIONS LIMITED, Bristol (GB)

(72) Inventor: Philip Jaggard, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 500 days.

(21) Appl. No.: 17/461,474

(22) Filed: Aug. 30, 2021

(65) Prior Publication Data

US 2022/0126988 A1    Apr. 28, 2022

(30) Foreign Application Priority Data

Oct. 23, 2020  (GB) ..................................... 2016859

(51) Int. Cl.
| | | |
|---|---|---|
| *F16F 7/12* | (2006.01) | |
| *B64C 25/60* | (2006.01) | |
| *B64F 5/60* | (2017.01) | |
| *F16F 7/00* | (2006.01) | |
| *B64C 25/00* | (2006.01) | |
| *B64D 45/00* | (2006.01) | |

(52) U.S. Cl.
CPC ................ *B64C 25/60* (2013.01); *B64F 5/60* (2017.01); *F16F 7/003* (2013.01); *F16F 7/125* (2013.01); *B64C 2025/008* (2013.01); *B64D 2045/008* (2013.01)

(58) Field of Classification Search
CPC .. F16F 7/003; F16F 7/125; F16F 9/062; F16F 9/063; B64C 25/60; B64C 2025/008
See application file for complete search history.

(56) References Cited

U.S. PATENT DOCUMENTS

| | | | | |
|---|---|---|---|---|
| 2,186,266 A | * | 1/1940 | Onion .................... | B64C 25/22 |
| | | | | 60/904 |
| 2,476,228 A | * | 7/1949 | Thornhill ................. | F16F 9/49 |
| | | | | 267/64.11 |
| 2,735,674 A | | 2/1956 | Smith et al. | |

(Continued)

FOREIGN PATENT DOCUMENTS

| | | |
|---|---|---|
| DE | 1 213 746 | 3/1966 |
| EP | 0 850 170 | 7/1998 |

(Continued)

OTHER PUBLICATIONS

Extended European Search Report for Application No. GB21187873.1, eight pages, Jan. 21, 2022.

(Continued)

*Primary Examiner* — Thomas J Williams
(74) *Attorney, Agent, or Firm* — Nixon & Vanderhye P.C.

(57) ABSTRACT

A shock absorber for an aircraft landing gear is disclosed. The shock absorber includes a stop surface arranged to limit extension of the shock absorber and a crumple element configured to deform in the event that the extension load on the stop surface exceeds a predetermined threshold. The crumple element may form part of the out-stop tube of the shock absorber. Deformation of the crumple element may be identified by measuring the length of the fully extending landing gear, through non-destructive testing or by measuring the change in conductance of the crumple element.

18 Claims, 6 Drawing Sheets

(56) References Cited

U.S. PATENT DOCUMENTS

| | | | | |
|---|---|---|---|---|
| 3,517,550 | A * | 6/1970 | Leventhal | G01L 5/0052 |
| | | | | 73/764 |
| 3,888,436 | A * | 6/1975 | Sealey | B64C 25/60 |
| | | | | 188/304 |
| 3,997,133 | A * | 12/1976 | Fagan | B64C 25/60 |
| | | | | 244/100 R |
| 4,058,188 | A * | 11/1977 | Vrillon | G21C 7/20 |
| | | | | 976/DIG. 129 |
| 4,273,303 | A * | 6/1981 | Somm | B60G 17/0155 |
| | | | | 188/289 |
| 4,552,324 | A * | 11/1985 | Hrusch | F16F 9/06 |
| | | | | 267/64.22 |
| 4,657,228 | A * | 4/1987 | Lautzenhiser | F16F 9/585 |
| | | | | 188/322.19 |
| 6,308,809 | B1 * | 10/2001 | Reid | E01F 15/146 |
| | | | | 188/377 |
| 8,042,765 | B1 * | 10/2011 | Nance | B64D 45/0005 |
| | | | | 244/100 R |
| 9,046,146 | B2 * | 6/2015 | Cotter | F16F 9/02 |
| 10,669,016 | B2 * | 6/2020 | Cusworth | B64C 25/34 |
| 2008/0111023 | A1 | 5/2008 | Lahargou et al. | |
| 2011/0214601 | A1 * | 9/2011 | Martin | B64D 45/00 |
| | | | | 116/203 |
| 2018/0327085 | A1 * | 11/2018 | Argiolas | G06F 30/15 |
| 2019/0381848 | A1 * | 12/2019 | Barefoot | B60G 11/27 |
| 2022/0126988 | A1 * | 4/2022 | Jaggard | B64C 25/60 |

FOREIGN PATENT DOCUMENTS

| | | | | |
|---|---|---|---|---|
| EP | 2 326 856 | | 6/2011 | |
| EP | 3 392 522 | | 10/2018 | |
| FR | 2 314 403 | | 1/1977 | |
| FR | 2 608 242 | | 6/1988 | |
| WO | 97/10145 | | 3/1997 | |
| WO | 2004/106769 | | 12/2004 | |
| WO | WO-2005022098 | A1 * | 3/2005 | B60T 8/00 |
| WO | 2010/029224 | | 3/2010 | |

OTHER PUBLICATIONS

Combined Search and Examination Report for GB2016859.7 dated Mar. 30, 2021, 4 pages.

* cited by examiner

AIRCRAFT LANDING GEAR SHOCK ABSORBER

CROSS RELATED APPLICATION

This application claims priority to United Kingdom Patent Application GB 2016859.7, filed Oct. 23, 2020, the entire content of which is hereby incorporated by reference.

BACKGROUND OF THE INVENTION

The present disclosure relates to an aircraft landing gear shock absorber. More particularly, but not exclusively, this invention an aircraft landing gear shock absorber comprising a crumple element. The invention also concerns a landing gear including such a shock absorber, an aircraft including such a landing gear and a method of detecting excessive landing gear loads using such a shock absorber.

An aircraft landing gear may have a shock absorber configured to damp movement of the wheels. Typically, such a shock absorber comprises a piston mounted within a cylinder and at least one stop configured to limit extension of the shock absorber and thereby retain the piston within the cylinder. The shock absorber is compressed by the weight of the aircraft when the wheels are in contact with the ground. When the weight of the aircraft comes off the wheels, for example on take-off, the wheels drop downward extending the shock absorber until the stop prevents further any further movement. The loads generated on the stop at the point it prevents further extension may be referred to as extension (or out-stop) loads. It will be appreciated that these extension loads may be transmitted to the rest of the shock absorber. Given the weight of the wheels and other elements of the landing gear associated therewith (for example axles, bogies, brakes and other elements), these extension loads may be significant and constitute a limiting load case for the design of the shock absorber. That is to say, the shape, size and configuration of various components of the shock absorber may be dictated by the need to withstand these extension loads. Some aircraft shock absorbers may comprise a recoil element to damp the extension of the shock absorber and thereby reduce the maximum extension loads generated by the downwards movement of the wheels. However, such recoil elements are often energised by compression of the shock absorber and therefore may not function when the shock absorber has only been partly compressed or compressed only for a brief period of time, for example when an aircraft carries out a 'touch and go' manoeuvre or aborted landing. Such recoil elements may also fail to damp the extension in the case of malfunction. In the event the recoil elements do not function as intended, extension loads experienced by the shock absorber may exceed those for which it has been designed (the design extension load). This may be referred to as an extension event.

Current practice is that following an event (e.g. an aborted take-off, 'touch and go' or other event) which may have resulted in extension loads exceeding the design maximum, the shock absorber is inspected. It would be advantageous to provide a means of indicating whether a shock absorber has been subjected to a load exceeding the design extension load in order to minimise the need for such inspections.

Inspection of the shock absorber typically requires that the aircraft be jacked up to take the weight off the landing gear wheels and the piston removed from the cylinder to allow inspection of the internal components. This is an expensive and time consuming process. It would be advantageous to provide a means of identifying whether a shock absorber has been subjected to a load exceeding the design extension load without disassembling the shock absorber.

The present invention seeks to mitigate the above-mentioned problems. Alternatively or additionally, the present invention seeks to provide an improved aircraft landing gear shock absorber and/or an improved method of operating an aircraft landing gear shock absorber.

SUMMARY OF THE INVENTION

The present invention provides, according to a first aspect an aircraft landing gear shock absorber. The shock absorber may comprise a stop surface. The stop surface may be arranged to limit extension of the shock absorber. The shock absorber may comprise a crumple element, for example a crumple element configured to deform in the event that the extension load on the stop surface exceeds a predetermined threshold. Thus, deformation of the crumple element may be used as an indication that the landing gear of which it forms a part has experienced an event in which the extension load exceeds the predetermined threshold (an extension event). Use of a crumple element may facilitate detection and/or confirmation of the extension event without the need to disassemble the shock absorber and/or landing gear of which it forms a part.

A crumple element may be defined as a component or region of a component configured to deform, for example to compact, buckle and/or fold, in the event that it is subjected to a load exceeding a predetermined threshold. The crumple element may be configured to undergo plastic deformation in the event that it is subjected to a load exceeding the predetermined threshold. The properties of the crumple element, for example the geometry, materials and/or structure, may differ from the rest of the structure lying along the load path between the stop surface and the crumple element such that the crumple element deforms at a lower extension load (for example the predetermined threshold) than the rest of the structure lying along the load path. The predetermined threshold may be the design extension load.

In the case that the crumple element is a region of a component, the properties, for example the geometry, material and/or structure, of the crumple element may differ from the properties of the rest of the component such that the crumple element deforms at a lower extension load than the rest of the component. In the case that the crumple element is a separate component, the properties, for example the geometry, material and/or structure, of the crumple element may differ from the properties of adjacent components and/or other components on the load path between the stop surface and the crumple element and/or between the stop surface and the cylinder such that the crumple element deforms at a lower extension load than said other components. Thus, it may be that the crumple element is a region of deliberate weakness in a component and/or on the load path via which extension loads experienced by the stop surface are reacted. It may be that the crumple element is made of a different material to the rest of the component and/or other components on the load path, for example a material having a lower Young's modulus. It may be that the crumple element has a different geometry to the rest of the component and/or other components on the load path, for example a reduced cross-sectional area, for example a reduced thickness. It may be that the crumple element has a different structure to the rest of the component and/or other components on the load path, for example the crumple element may comprise one or more folds, recesses and/or through holes.

The crumple element may be located at on a load path via which extension loads experienced by the stop surface are reacted. The crumple element may be connected to the stop surface such that extension loads experienced by the stop surface are transferred (in whole or in part) to the crumple element, optionally via one or more intermediate components.

It may be that the shock absorber includes a piston assembly, the piston assembly comprising a piston (also known as an inner tube). The piston (and the piston assembly) may be mounted for movement relative to a cylinder (also known as an outer tube and not necessarily being cylindrical in form). The piston (and the piston assembly) may be mounted for movement between a compressed configuration and an extended configuration. Extension of the shock absorber may comprise the piston (and piston assembly) moving relative to the cylinder in a first direction such that the length of the shock absorber increases. Compression of the shock absorber may comprise the piston (and piston assembly) moving relative to the cylinder in a second, opposite, direction such that the length of the shock absorber decreases. The shock absorber may be configured such that the stop surface limits extension of the shock absorber by preventing further movement of the piston (and piston assembly) in the first direction. The shock absorber may be configured such that the stop surface contacts the piston assembly in an abutting relationship to prevent further extension of the shock absorber. The length of the shock absorber beyond which further extension is prevented by the stop surface may be referred to as the length as maximum extension. It may be that at least a portion of the piston (or piston assembly) is received within the cylinder.

The shock absorber may be configured such that the deformation experienced by the crumple element in the event that extension loads exceed the predetermined threshold results in a change, for example an increase, in the length of the shock absorber at maximum extension. In this way, confirmation and/or detection of an extension event may be achieved by measuring the length of the shock absorber at maximum extension which a change in length providing an indication that the crumple element has deformed and the shock absorber and/or landing gear of which it forms a part has experienced an extension event. Such a shock absorber may allow detection and/or confirmation of the extension event without the need to disassemble the shock absorber and/or landing gear of which it forms a part. The crumple element may be configured such that the length of the crumple element reduces in the event the extension load exceeds the predetermined threshold. The length of the crumple element may be the maximum dimension of the crumple element in a direction parallel to the direction of movement of the piston relative to the cylinder. The length of the landing gear may change by between 1 and 5 mm for example between 2 and 4 mm in the event of an extension event. Such a change in length may be sufficient to be detectable without undue effort while allowing the landing gear to continue to operate safely.

The cylinder may have a first end and optionally, a second end opposite the first end. The stop surface may be spaced apart from the first end of the cylinder, for example along an axis of the shock absorber parallel to the direction of movement of the piston relative to the cylinder. The crumple element may be located between the first end and the stop surface (for example the first end, crumple element and stop surface being spaced apart along the length of the cylinder in that order) such that deformation of the crumple element decreases the distance between the first end and the stop surface thereby resulting in an increase in the length of the shock absorber at maximum extension. Thus, it may be that the first end and stop surface are spaced apart by a first distance prior to deformation of the crumple element, and a by a second, smaller, distance following deformation of the crumple element.

It may be that the stop surface is mounted on the cylinder such that a load path extends between the stop surface and the cylinder via which the extension load on the stop surface is transferred (at least in part) to the cylinder. It may be that the crumple element is located on the load path.

It may be the shock absorber comprises a stop, for example mounted on, for example within and/or on the cylinder. It may be that the stop comprises the stop surface.

It may be that the shock absorber comprises a sleeve (which may be known as an out-stop sleeve) mounted within and/or the cylinder. It may be that the sleeve comprises the stop-surface. It may be that the stop-surface is formed by a first end of the sleeve, for example the end of the sleeve furthest from the first end of the cylinder. Thus, it may be that the piston assembly abuts the sleeve, for example the first end of the sleeve when the shock absorber is at maximum extension. It may be that the load path between the stop surface and the cylinder extends through the sleeve. It may be that the sleeve extends around the whole or a portion of the outside of, for example the outer circumference of, the piston. It may be that the sleeve is a tubular member. It may be that the sleeve is concentrically mounted with the cylinder and/or the piston. It may be that the sleeve is mounted between the cylinder and the piston.

It may be that the piston assembly comprises a piston-bearing, for example in the region of an end of the piston located within the cylinder. It may be that the piston-bearing contacts the stop-surface when the shock absorber is at maximum extension. It may be that the cylinder comprises a cylinder-bearing, for example in the region of the first end of the cylinder. It may be that the sleeve has a second end, opposite the first end. It may be that the second end of the sleeve abuts the cylinder-bearing, for example such that the sleeve is retained in the cylinder by the cylinder-bearing. It may be that the cylinder-bearing lies on the load path between the stop surface and the cylinder, for example the load path may terminate at the cylinder-bearing. It may be that the sleeve comprises the crumple element. Forming the crumple element within the sleeve may allow for detection and/or confirmation of an extension event without the need for any additional components in the shock absorber and/or in a mechanically simple manner. It may be that the crumple element comprises a region of the sleeve having different properties (for example geometry, material and/or structure) to the rest of the sleeve such that the crumple element deforms at a lower load than the rest of the sleeve.

It may be that the shock absorber is an oleo strut. An oleo strut may be defined as a hydraulic shock absorber that uses a mixture of gas and liquid, for example air and oil. Such struts are well known in the landing gear industry.

It may be that the crumple element is located within the shock absorber, for example within the cylinder such that the crumple element (and/or deformation of said element) is not visible in normal use. Thus, it may be that no visible indication of an extension event is provided.

According to a second aspect of the invention there is also provided a landing gear comprising an aircraft landing gear shock absorber according to the first or any other aspect.

It may be that the landing gear comprises a main fitting and a main strut (or landing gear leg) mounted for movement relative to the main fitting. It may be that the shock absorber is arranged to damp movement of the main strut relative to the main fitting. It may be that the main fitting comprises the cylinder. It may be that the main strut comprises the piston.

The landing gear may comprise one or more wheels mounted to the distal end of the main strut. The landing gear may comprise one or more axles and/or bogies via which one or more wheels are mounted on the main strut.

The landing gear and/or actuator may comprise one or more sensors configured to detect a change in length of the landing gear and/or actuator as a result of the deformation of the crumple element. For example the landing gear may comprise at least one proximity sensor and a least one target. The landing gear may be configured such that deformation of the shock absorber results in the proximity sensor and target moving into or out of proximity such that the signal from said sensor provides an indication of a change in length of the shock absorber.

According to a third aspect of the invention there is also provided an aircraft including an aircraft landing gear shock absorber according to the first or any other aspect and/or a landing gear according to the second or any other aspect.

The aircraft may be a commercial passenger aircraft, for example an aircraft configurable to carry more than fifty passengers, for example more than one hundred passengers. It may be that the aircraft is a fixed wing aircraft. It may be that the landing gear is a wing mounted landing gear (i.e. mounted wholly or partially to a wing of the aircraft), a fuselage mounted landing (i.e. mounted wholly or partially to the fuselage of the landing gear) and/or a nose landing gear (e.g. a steerable landing gear). It may be that the landing gear is a retractable landing gear.

The aircraft may comprise a control system configured to provide an indication to a pilot in the event that a change in length of the landing gear is detected, for example in the event a sensor, for example a proximity sensor indicates a change in length has occurred.

According to a fourth aspect of the invention there is provided an aircraft landing gear having an oleo strut. The oleo strut may comprise one or more of a cylinder, a piston mounted for movement within the cylinder, and an out-stop tube mounted within the cylinder. It may be that when the oleo strut is in an extended configuration, the piston and the out-stop tube are in an abutting relationship such that further extension of the oleo strut is prevented. It may be that the out-stop tube comprises a crumple element configured to deform at a lower extension load than the rest of the out-stop tube.

According to a fifth aspect of the invention there is provided a method of determining whether an aircraft landing gear has experienced an extension event. The landing gear may comprise a shock absorber having a crumple element. An extension event may be defined as the extension loads generated when the shock absorber reaches maximum extension exceeding a predetermined threshold (for example the design maximum). It may be that the method comprises determining whether the crumple element has deformed, and, in dependence on whether the crumple element has deformed, determining whether an extension event has occurred. For example, the method may comprise determining that an extension event has occurred if the crumple element has deformed and/or that an extension event has not occurred if the crumple element is undeformed.

In the case that an extension event occurs, it may be that the crumple element deforms when the extension loads exceed the predetermined threshold, but the rest of the shock absorber (and/or the component of which the crumple element forms a part) does not deform.

It may be that the length of the crumple element changes, for example reduces in the case that the extension loads exceed the predetermined threshold. It may be that deformation of the crumple element causes a change in the length of the landing gear at maximum extension. Thus, determining whether the crumple element has deformed may comprise determining whether the length of the landing gear has changed, for example increased, with respect to the original or design length. The method may comprise measuring the landing gear to ascertain whether the length of the landing gear at maximum extension has increased. The method may comprise measuring the overall length of the landing gear and/or the distance between a first reference point (for example on the cylinder) and a second reference point (for example on the piston). The method may comprise measuring the landing gear at maximum extension, for example without the weight of the aircraft on the wheels and/or when the piston (or piston assembly) abuts the stop surface. The method may comprise taking the weight of the aircraft off the wheels, for example by jacking up the aircraft or by causing the aircraft to take-off and then measuring the landing gear. The method may comprise one or more sensors, for example a proximity sensor as described above, providing information regarding the length of the landing gear at maximum extension, for example a signal that indicates a change in the length of the landing gear. The method may comprise a control system processing a signal from one or more sensor and, in the event that said signal indicates the length of the landing gear has changed, providing an indication (for example an audio or visual signal) to the pilot of an aircraft that the landing gear may have experienced an extension event.

Determining whether the crumple element has deformed may comprise using a non-destructive testing technique and/or an imaging technique, for example ultrasound or x-ray, to ascertain whether the shape of the crumple element has changed. If the shape has changed this may be taken as an indication that an extension event has taken place. Non-destructive testing/imaging may be a quick and/or cost effective way of determining whether a landing gear has experienced an extension event and/or avoids the need to measure the landing gear when fully extended (i.e. at weight of wheels) and/or to disassembly the landing gear.

Determining whether the crumple element has deformed may comprise measuring the (electrical) conductance of the crumple element. If the conductivity has changed, for example by more than a predetermined amount, this may be taken as an indication that an extension event has taken place. This may comprise measuring one or more of the current through, voltage across and/or resistance of the crumple element or the component of which it forms a part and/or the shock absorber and/or the landing gear. Measuring the conductivity of the crumple element (or a portion of the load path including the crumple element) may be a quick and/or cost effective way of determining whether a landing gear has experienced an extension event and/or avoids the need to measure the landing gear when fully extended (i.e. at weight of wheels) and/or to disassembly the landing gear.

The method may take place at predetermined intervals, for example as part of a routine maintenance schedule. Additionally or alternatively, the method may be carried out following a suspected extension event, for example an aborted landing or take-off.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
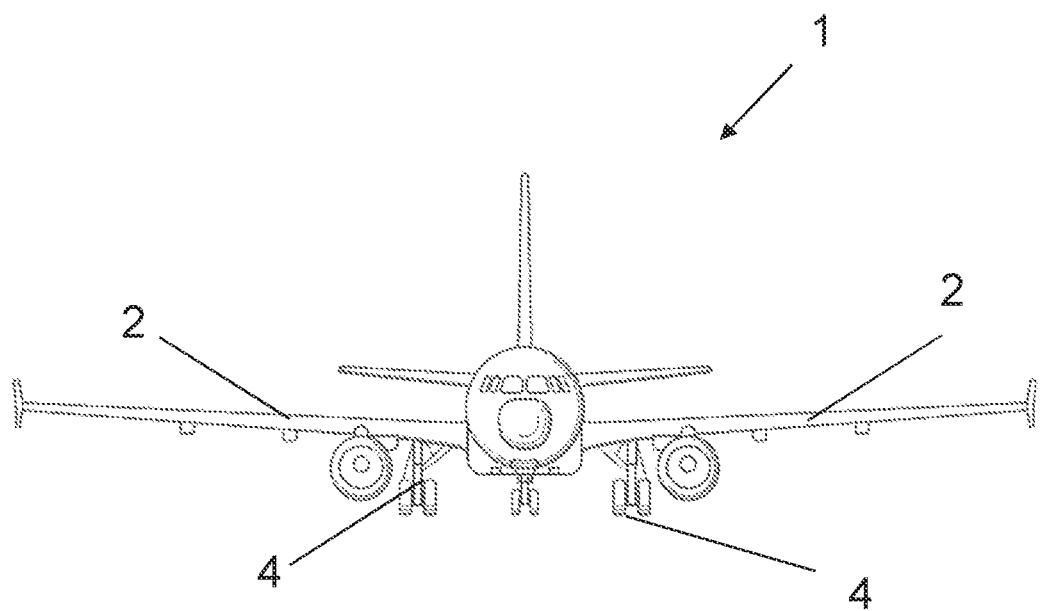
FIG. 1 shows a front view of an aircraft according to a first embodiment of the invention.

FIG. 1 shows an aircraft 1 having two wings 2, each wing having a landing gear 4 mounted thereon. While FIG. 1 shows landing gear 4 mounted on the wing, in other embodiments the landing gear may be a nose landing gear or may be mounted on the fuselage of the aircraft.

Figure 2:
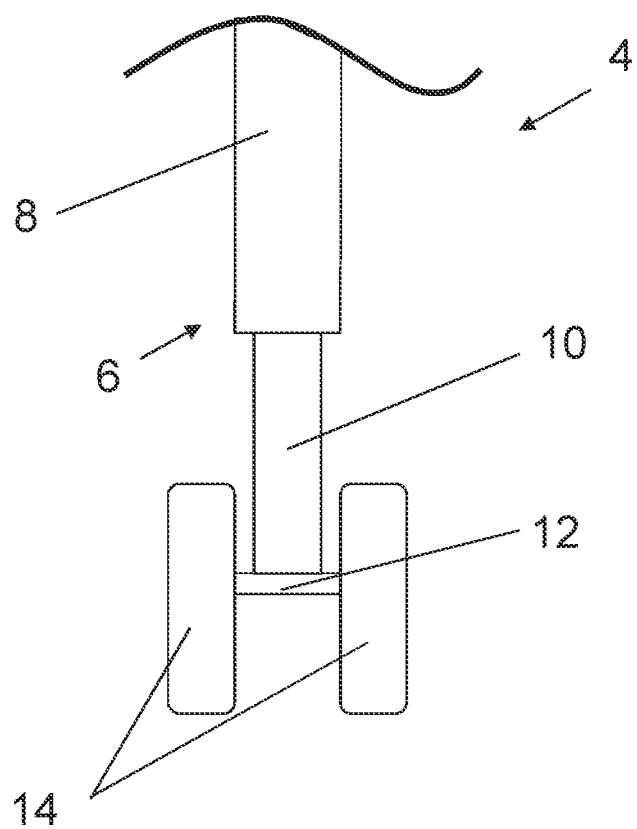
FIG. 2 shows a close up of a portion of the landing of FIG. 1.

FIG. 2 shows a close up of a portion of the landing gear 4 of FIG. 1. The landing gear 4 comprises a shock absorber 6 having a cylinder 8 and a piston 10. An axle 12 is mounted at the distal end of the piston 10. A pair of wheels 14 are mounted on the axle 12. The shock absorber 6 may be a fluid spring shock absorber, for example an oleo strut (i.e. a gas-oil shock absorber), an oil-filled shock absorber, a pneumatic shock absorber, a solid spring shock absorber or other type of shock absorber.

Figure 3A:
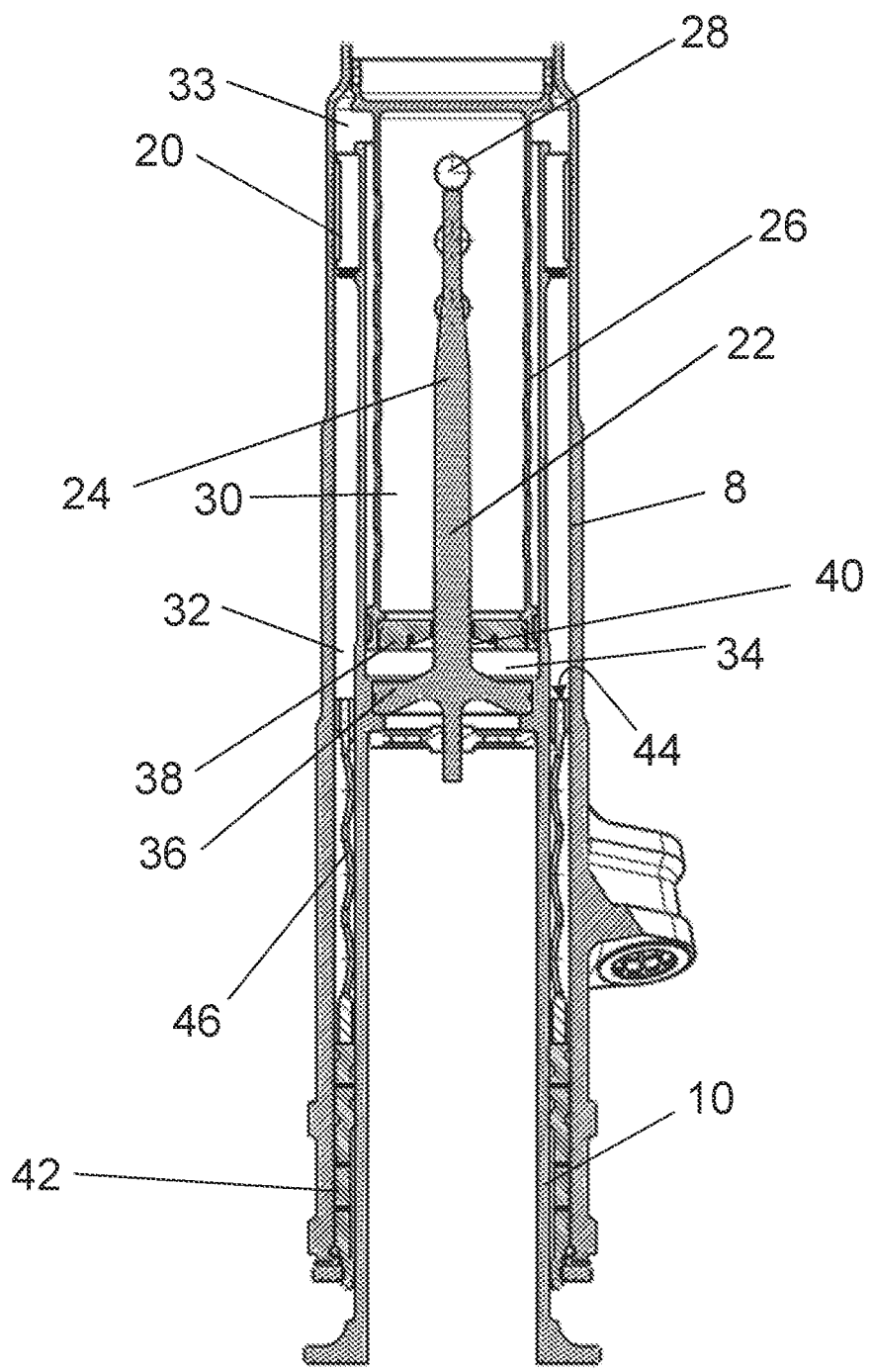
FIGS. 3(a) and 3(b) show cross-sectional views of portions of the landing gear of FIG. 1, when FIG. 3(a) the landing gear is compressed and FIG. 3(b) the landing gear is extended.

FIG. 3 (a) shows a cross-sectional view of a portion of the landing gear 4 of FIG. 1 in a compressed configuration, for example while the aircraft 1 is taxiing. Piston 10 is in the form of a tube mounted concentrically within cylinder 8. A piston-bearing 20 is mounted to and extends around the outside of the upper end of the piston 10. A slider 22 is mounted within and partway along the piston 10 and comprises a metering pin 24 (being an elongate member of varying cross-section) concentric with cylinder 8 which extends upwards into orifice tube 26. The lower end of slider 22 comprises an end portion 36 which extends across the interior of the piston 10 to form a reservoir 34 within the piston above the end portion 36. Orifice tube 26 is mounted concentrically with cylinder 8 and piston 10 and comprises a plurality of orifices 28. The orifice tube 26 divides the volume within cylinder 8 into an inner chamber 30 (located inside the orifice tube 26 and having the metering pin 24 extending into it in FIG. 3(a)) and an outer chamber 33 (located outside the orifice tube 26). The piston bearing 20 has a plurality of damping orifices (not shown) formed therein which extend axially from the top side to the bottom side of the piston bearing 20 thereby providing fluid communication between the outer chamber 33 and a recoil chamber 32 which is formed between cylinder 8 and piston 10 beneath the piston bearing 20. An orifice plate 38 extends across the bottom of orifice tube 26 and has a main orifice 40 formed therein. The metering pin 24 of the slider 22 extends through the main orifice 40 with the end portion 36 being located below the orifice plate 38 and therefore outside the inner chamber 30. An out-stop tube 46 is located concentrically with and in-between cylinder 8 and piston 10 (in recoil chamber 32) and extends from just below the orifice plate towards the lower end of the cylinder 8 where the out-stop tube 46 abuts a cylinder-bearing 42 mounted within and to the cylinder 8 at its lower end. The top of the out-stop tube 46 forms a stop-surface 44.

Figure 3B:
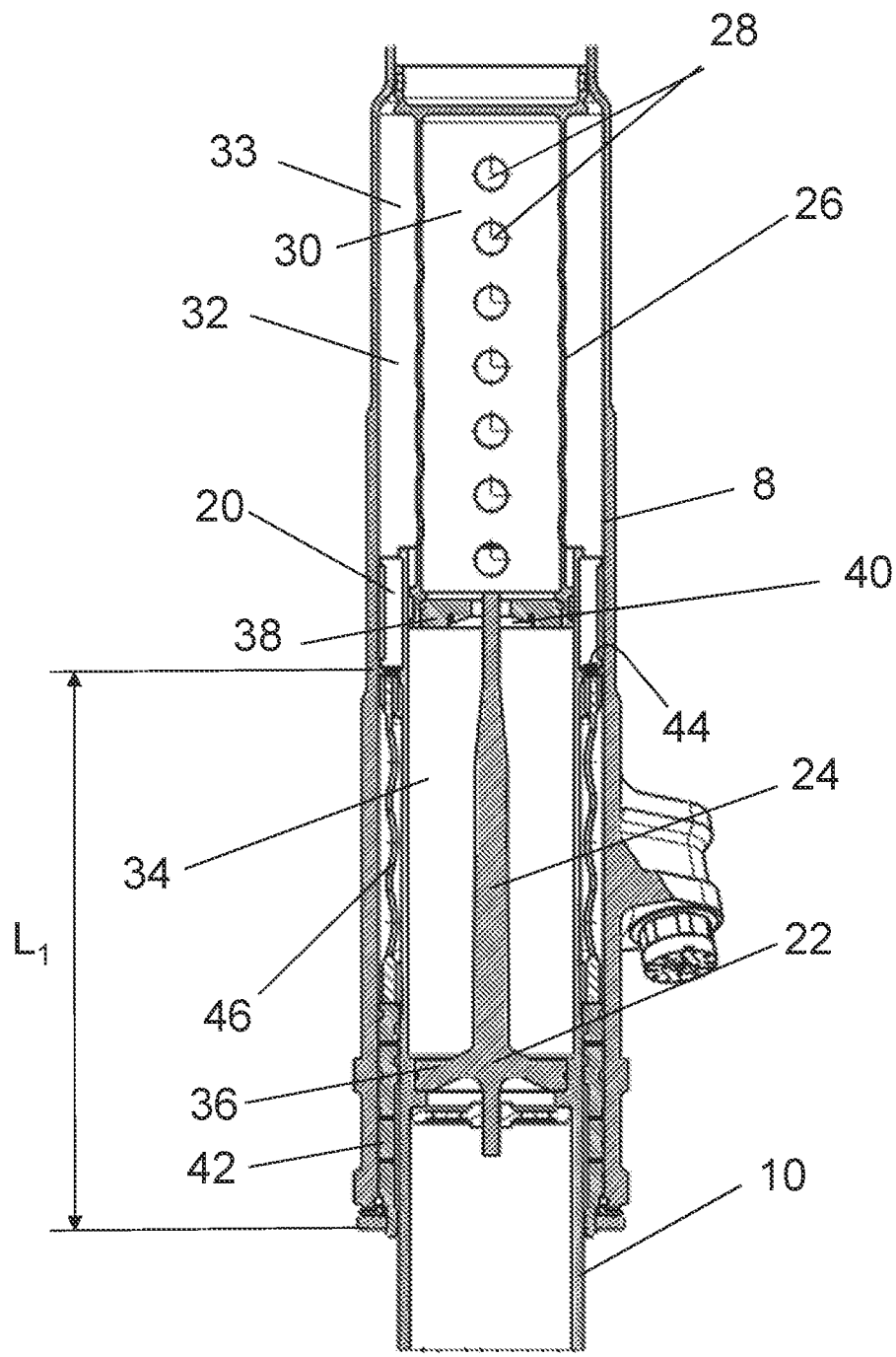

FIG. 3(b) shows the landing gear of FIG. 3(a) in an extended configuration during normal operation, for example following take off. In comparison to FIG. 3(a) the piston 10 including slider 22 has moved downwards until piston-bearing 20 abuts stop-surface 44 of out-stop tube 46. The distal end of the metering pin 24 is located in main-orifice 40 but does not extend significantly beyond the main orifice 40 into inner chamber 30.

In normal operation (as shown in FIGS. 3(a) and 3(b)) when the weight of the aircraft 1 goes onto the wheels 14, for example on landing, gas in reservoir 34 is compressed forcing oil in reservoir 34 through main-orifice 40 into inner chamber 30. Oil then flows via orifices 28 from inner chamber 30 into outer chamber 33. When sufficiently pressurized, oil from outer chamber 33 flows through the damping orifices in piston bearing 20 into recoil chamber 32. Upward movement of the piston 10 and slider 22 causes the metering pin 24 to move relative to the main orifice 40. The metering pin 24 is thicker at its base than at its tip so the cross-sectional area of the main orifice 40 through which fluid can flow reduces as the metering pin 24 moves upwards. This increases the resistance to the flow of fluid through main orifice 40 and damps the upwards movement of the piston 10. When the weight comes off the wheels 14, for example following take-off, the piston 10 drops downward under the weight of the wheels 14, and the presence of oil in recoil chamber 32 slows the descent of piston-bearing 20 thereby damping the extension of the piston 10. The piston 10 continues to move downwards within cylinder 8 until the piston-bearing 20 abuts stop-surface 44. Stop-surface 44 thereby limits extension of the landing gear 4.

In the case that the landing gear 4 is severely compressed for only a short time before being released (for example following a touch and go event) little or no oil will have flowed into the recoil chamber 32 at the point the load comes off the wheels 14. As a consequence the extension of the landing gear—i.e. the downward motion of the piston 10—will be undamped or insufficiently damped and the piston 10 is travelling faster when the piston-bearing 20 reaches stop-surface 44, thereby generating a larger extension load on stop-surface 44 which may exceed the design maximum. Length $L_1$ is the distance between the lower-end of piston bearing 20 and the lower end of the cylinder 8 in FIG. 3(b).

Figure 4A:
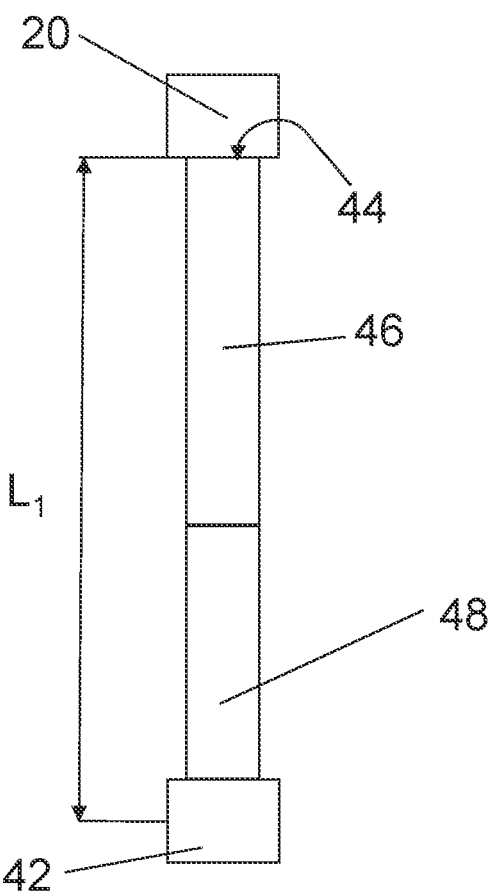
FIGS. 4(a) and 4(b) show highly schematic close-up cross-sectional views of part of the landing gear of FIG. 3(a) before and FIG. 3(b) after an extension event.
Figure 4B:
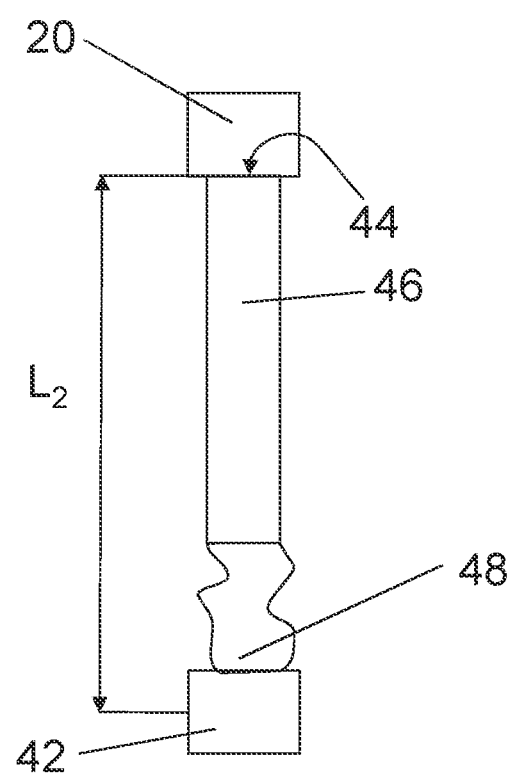

FIG. 4 shows a highly schematic view of part of the landing gear of FIG. 3 in an extended configuration (a) before and (b) following an event, for example a 'touch-and-go' which has caused the extension load to exceed the design maximum. In FIG. 4(b) a region 48 of the out-stop tube 46 has crumpled (the region 48 may therefore be referred to as a crumple element or crumple zone) and is deformed compared to the rest of the out-stop tube 46 and the appearance of said region 48 in FIG. 4(a). In FIG. 4 region 48 is located at the lower end of the out-stop tube 46 but the axial and/or circumferential position of the region 48 is not of particular importance. Length $L_2$ is the distance between the lower-end of piston bearing 20 and the lower end of the cylinder 8. As a consequence of the compacting of region 48, length $L_2$ is less than length $L_1$ because the out-stop tube 46 is now shorter allowing piston-bearing 20 to move further down the cylinder 8 and the landing gear 4 is longer in FIG. 4(*b*) than in FIG. 4(*a*).

In some embodiments the out-stop tube 46 is made of Aluminium, but it will be appreciated that other materials may be used. In the same or yet further embodiments, the region 48 is made of the same material as the rest of the out-stop tube 46 but has a different geometry, for example a reduced thickness in comparison to other regions of the out-stop tube. In other embodiments, the region 48 is made of different material to the rest of the out-stop tube 46. In yet further embodiments the region 48 has a different structure to the rest of the out-stop tube 46, for example comprises one or more folds, recesses and/or through holes that reduce the level of extension load required to deform the element. In the same or yet further embodiments, the crumple element may be provided as a separate component on the load path between the stop-surface 44 and the cylinder-bearing 42. In some embodiments the length of the landing gear may increase by 2 to 3 mm following deformation of the crumple element. Embodiments of the invention comprise an element (a crumple element) designed to deform when subjected to a pre-determined load. Such elements may constitute a deliberate region of weakness along the load path via which extension loads associated with stopping downward motion of the piston are reacted by the cylinder. It will be appreciated by the skilled person that there are a number of different ways in which such crumple elements may be provided which including but not limited to including different materials, geometry and/or structure in the design of such an element.

By including a crumple element as described above, landing gear in accordance with the present example embodiment may allow for the detection and/or confirmation of an event in which the extension load generated during extension of the landing gear exceeds a predetermined level (hereafter an extension event), for example the design maximum. In particular, including a crumple element as described above may allow for the detection and/or confirmation of such an event without needing to disassemble the landing gear. Additionally or alternatively, a crumple element as described above may be integrated into an existing component of the landing gear, such as the out-stop sleeve, thereby allowing for the detection and/or confirmation of an extension event without requiring any additional components in the landing gear. Additionally or alternatively, including a crumple element as described above may allow for the detection and/or confirmation of such an extension event in a mechanically simple and reliable manner.

Figure 5:
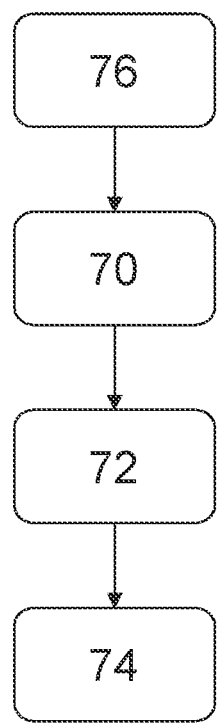
FIG. 5 shows an example method in accordance with the invention.

FIG. 5 shows a flow chart of example method in accordance with the invention. The method of FIG. 5 comprises measuring the length 70 of the landing gear at maximum extension. In some embodiments the overall length of the landing gear is measured (e.g. the distance between the proximal and distal ends of the landing gear). In other embodiments the distance between a first reference point (for example on the cylinder or the main fitting of the landing gear) and a second reference point on the landing gear (for example on the piston) is measured. The method comprises determining 72 whether an extension event has occurred in dependence on the length so measured. If the length of the landing gear at maximum extension has increased, for example by more than a predetermined threshold amount, this is taken as an indication that the landing gear has experienced an extension event. Conversely, if the length of the landing gear has not increased or has increased by less than the predetermined threshold amount, this is taken as an indication that the landing gear has not experienced an extension event. If it is determined that an extension event 72 has been carried out landing gear maintenance 72 can take place as appropriate. Optionally, the method comprises jacking up 76 the aircraft in order to take the weight of the wheels and the landing gear to extend prior to measuring the length 70. In other example methods, the step of measuring the length 70 may be carried out while the aircraft is in flight. In such methods one or more sensors may be used to detect a change in the length of the landing gear. For example, by verifying whether a target (for example on the piston) remains in proximity to a proximity sensor (for example on the cylinder).

In other methods in accordance with the invention detection and/or confirmation of an extension event may be achieved by determining whether or not the crumple element has crumpled, for example using non-destructive testing techniques including x-ray and/or ultrasound. Such techniques may allow the extension event to be confirmed and/or detected without needing to jack up the aircraft. In the same or yet further embodiments, an extension event may be achieved by determining whether the electrical conductivity i.e. resistance of the out-stop sleeve (or any other element containing the crumple element) has changed.

Whilst the present invention has been described and illustrated with reference to particular embodiments, it will be appreciated by those of ordinary skill in the art that the invention lends itself to many different variations not specifically illustrated herein. By way of example only, it will be appreciated that application of the invention is not limited to a landing gear having the specific geometry and arrangement described above and shown in the attached figures. For example, the shape and/or construction of the cylinder, piston, slider, recoil chamber, compression chamber, out-stop tube, piston-bearing and/or cylinder-bearing may differ from that described herein. In some embodiments one or more of the slider, recoil chamber, compression chamber, out-stop tube, piston-bearing and/or cylinder-bearing may be absent entirely. The layout of the main and other orifices may differ from that described above and in some embodiments one or more or all of said orifices may be absent. For example, the invention may find application in landing gear that do not rely on oil and/or gas for damping.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft landing gear shock absorber, the shock absorber comprising a stop surface arranged to limit extension of the shock absorber and a crumple element configured to deform in the event that an extension load on the stop surface exceeds a predetermined threshold, wherein the crumple element comprises holes, and wherein the shock absorber is an oleo strut.

2. An aircraft landing gear shock absorber according to claim 1, wherein the shock absorber is configured such that the deformation experienced by the crumple element in the event that extension load exceeds the predetermined threshold results in an increase in the length of the shock absorber at maximum extension.

3. An aircraft landing gear shock absorber according to claim 2, wherein the shock absorber comprises a cylinder having a first end and a piston mounted for movement relative to the cylinder and the crumple element is located between the first end and the stop surface such that deformation of the crumple element decreases the distance between the first end and the stop surface thereby resulting in an increase in the length of the shock absorber at maximum extension.

4. An aircraft landing gear shock absorber according to claim 3, wherein the stop surface is mounted on the cylinder and a load path extends between the stop surface and the cylinder such that the extension load on the stop surface is transferred, at least in part, to the cylinder via the load path, the crumple element being located on the load path.

5. An aircraft landing gear shock absorber according to claim 1, wherein the shock absorber comprises a sleeve mounted within the cylinder, the sleeve comprising the stop surface.

6. An aircraft landing gear shock absorber according to claim 5, further comprising an out-stop sleeve, wherein the out-stop sleeve comprises the crumple element.

7. An aircraft landing gear shock absorber according to claim 1, wherein the crumple element is configured to plastically deform at a lower extension load than other components of the shock absorber.

8. An aircraft landing gear shock absorber according to claim 1 wherein the crumple element is located within the shock absorber such that the crumple element is not visible in normal use.

9. An aircraft landing gear comprising an aircraft landing gear shock absorber in accordance with claim 1.

10. An aircraft comprising an aircraft landing gear according to claim 9.

11. An aircraft landing gear having an oleo strut comprising a cylinder, a piston mounted for movement within the cylinder, and an out-stop tube mounted within the cylinder, wherein in an extended configuration, the piston and the out-stop tube are in an abutting relationship such that further extension of the oleo strut is prevented, and the out-stop tube comprises a crumple element forming a part of the out-stop tube which deforms at the lowest extension load, and wherein the crumple element comprises holes.

12. A method of determining whether an aircraft landing gear has experienced an extension event, wherein the landing gear comprises a shock absorber having a crumple element and the extension event comprises extension loads generated when the shock absorber reaches maximum extension exceeding a predetermined threshold, wherein the crumple element comprises holes, the method comprising determining whether the crumple element has deformed, and, in dependence on whether the crumple element has deformed, determining whether the extension event has occurred, and wherein the shock absorber is an oleo strut.

13. A method according to claim 12, wherein determining whether the crumple element has deformed comprises measuring the landing gear to ascertain whether the length of the landing gear at maximum extension has increased.

14. A method according to claim 12, wherein determining whether the crumple element has deformed comprises using a non-destructive testing technique and/or an imaging technique.

15. A method according to claim 12, wherein determining whether the crumple element has deformed comprises measuring the conductance of the crumple element.

16. A method according to claim 12, wherein the crumple element is configured to plastically deform at a lower extension load than other components of the shock absorber.

17. A method according to claim 12, wherein determining whether the crumple element has deformed comprises using ultrasound or x-ray to ascertain whether the shape of the crumple element has changed.

18. A method of determining whether an aircraft landing gear has experienced an extension event, wherein the landing gear comprises a shock absorber having a crumple element and the extension event comprises extension loads generated when the shock absorber reaches maximum extension exceeding a predetermined threshold, wherein the crumple element comprises holes, the method comprising determining whether the crumple element has deformed, and, in dependence on whether the crumple element has deformed, determining whether the extension event has occurred, and wherein determining whether the crumple element has deformed comprises using ultrasound or x-ray to ascertain whether the shape of the crumple element has changed.

* * * * *